(12) United States Patent
Taylor

(10) Patent No.: US 8,896,593 B2
(45) Date of Patent: Nov. 25, 2014

(54) PRODUCING THREE-DIMENSIONAL GRAPHICS

(75) Inventor: Robert Joseph Taylor, Groton, MA (US)

(73) Assignee: Monotype Imaging Inc., Woburn, MA (US)

( * ) Notice: Subject to any disclaimer, the term of this patent is extended or adjusted under 35 U.S.C. 154(b) by 481 days.

(21) Appl. No.: 13/153,956

(22) Filed: Jun. 6, 2011

(65) Prior Publication Data

US 2012/0306852 A1    Dec. 6, 2012

(51) Int. Cl.
*G06T 15/00*    (2011.01)
*G06T 15/40*    (2011.01)
*G06T 11/00*    (2006.01)

(52) U.S. Cl.
CPC ...................................... *G06T 11/00* (2013.01)
USPC .......................................... 345/419; 345/421

(58) Field of Classification Search
CPC combination set(s) only.
See application file for complete search history.

(56) References Cited

U.S. PATENT DOCUMENTS

| | | | |
|---|---|---|---|
| 7,555,157 B2 | 6/2009 | Davidson et al. | |
| 2002/0095236 A1 | 7/2002 | Dundorf | |
| 2007/0018980 A1* | 1/2007 | Berteig et al. | 345/426 |
| 2008/0294393 A1 | 11/2008 | Laake et al. | |
| 2010/0111417 A1 | 5/2010 | Ward et al. | |
| 2011/0050864 A1* | 3/2011 | Bond | 348/51 |
| 2012/0176367 A1* | 7/2012 | Genova et al. | 345/419 |

OTHER PUBLICATIONS

International Search Report and Written Opinion, PCT/US2012/040842, dated Dec. 27, 2012, 8 pages.

* cited by examiner

*Primary Examiner* — Kee M Tung
*Assistant Examiner* — Leon T Cain, II
(74) *Attorney, Agent, or Firm* — Fish & Richardson P.C.

(57) ABSTRACT

A system includes a computing device for producing a representation of a graphical element on a two dimensional set of image points. A metric value is calculated for each image point in the two dimensional set of image points. The computer device is configured to assign a visual property to image point in the two dimensional set of image points based upon the corresponding metric value. The computing device is also configured to present the assigned visual properties of the two dimensional set of image points as being offset from another two dimensional set of image points to provide a three dimensional appearance of the graphical element.

34 Claims, 7 Drawing Sheets

(a)

(b)

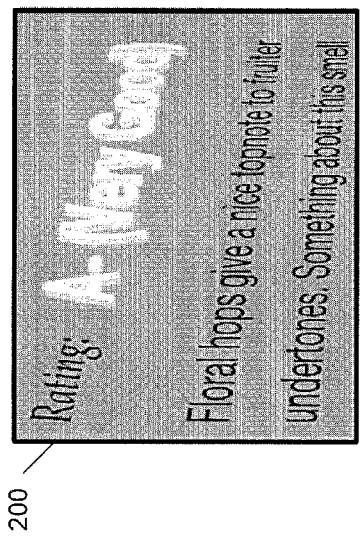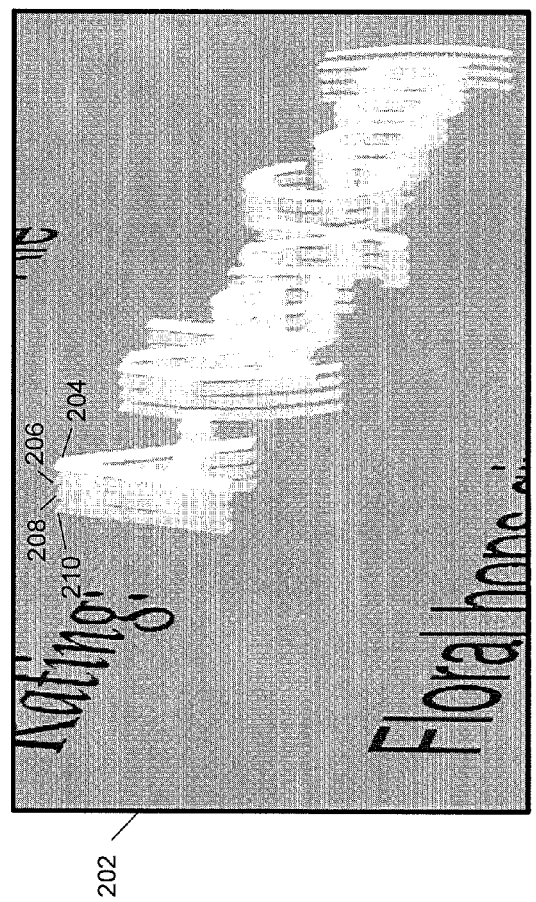
FIG. 2

PRODUCING THREE-DIMENSIONAL GRAPHICS

BACKGROUND

This description relates to producing the appearance of three-dimensional graphics for representing text, objects and other types of graphical elements.

In the ever-expanding field of presenting three-dimensional (3D) imagery on two-dimensional surfaces such as documents, computer displays and even motion picture theater screens, text and other types of graphics can be used for various applications. Large and imposing 3D text can often be found in advertisements to draw the attention of a casual observer to the content of the message. Magazines, newspapers (and other types of periodicals) along with websites and webpages may also use 3D text to emphasize content along with providing a more interesting visual experience for a reader.

SUMMARY

The systems and techniques described here relate to efficiently producing the appearance of three-dimensional text and other types of graphical elements by computationally defining and stacking two-dimensional representations of the text.

In one aspect, a computer-implemented method includes producing a representation of a graphical element on a two dimensional set of image points. A metric value is calculated for each image point in the two dimensional set of image points. The method also includes assigning a visual property to each image point in the two dimensional set of image points based upon the corresponding metric value. The method also includes presenting the assigned visual properties of the two dimensional set of image points as being offset from another two dimensional set of image points to provide a three dimensional appearance of the graphical element.

Implementations may include any or all of the following features. Producing the representation of the graphical element on the two dimensional set of image points may be provided by a central processing unit. Assigning the visual property to each image point may be provided by a graphical processing unit. The visual property may be an opaque visual property, a transparent visual property, or other type of visual property. Each image point in the two dimensional set of image points may represent a pixel. The metric value may be based upon a distance between the position of the image point and a boundary of the representation of the graphical element. The graphical element may be a textual element. Assigning the visual property to each image point may be provided by a shader process executed by a graphical processing unit.

In another aspect, a system includes a computing device for producing a representation of a graphical element on a two dimensional set of image points. A metric value is calculated for each image point in the two dimensional set of image points. The computer device is configured to assign a visual property to each image point in the two dimensional set of image points based upon the corresponding metric value. The computing device is also configured to present the assigned visual properties of the two dimensional set of image points as being offset from another two dimensional set of image points to provide a three dimensional appearance of the graphical element.

Implementations may include any or all of the following features. The computing device may include a central processing unit for producing the representation of the graphical element on the two dimensional set of image points. The computing device may include a graphical processing unit for assigning the visual property to each image point. The visual property may be an opaque visual property, a transparent visual property or other type of visual property. Each image point in the two dimensional set of image points may represent a pixel. The metric value may be based upon a distance between the position of the image point and a boundary of the representation of the graphical element. The graphical element may be a textual element. The computing device may include a graphical processing unit for executing a shader process to assign the visual property to each image point.

In another aspect, one or more computer readable media storing instructions that are executable by one or more processing devices, and upon such execution cause the one or more processing devices to perform operations that include producing a representation of a graphical element on a two dimensional set of image points. A metric value is calculated for each image point in the two dimensional set of image points. Operations also include assigning a visual property to each image point in the two dimensional set of image points based upon the corresponding metric value. Operations also include presenting the assigned visual properties of the two dimensional set of image points as being offset from another two dimensional set of image points to provide a three dimensional appearance of the graphical element.

Implementations may include any or all of the following features. Producing the representation of the graphical element on the two dimensional set of image points may be provided by a central processing unit. Assigning the visual property to each image point may be provided by a graphical processing unit. The visual property may be an opaque visual property, a transparent visual property, or other type of visual property. Each image point in the two dimensional set of image point may represent a pixel. The metric value may be based upon a distance between the position of the image point and a boundary of the representation of the graphical element. The graphical element may be a textual element. Assigning the visual property to each image point may be provided by a shader process executed by a graphical processing unit.

In another aspect, a computing device includes a memory for storing instructions. The computing device also includes a first processor for executing the instructions to produce a representation of a graphical element on a two dimensional set of image points. A metric value is calculated for each image point in the two dimensional set of image points. The computing device also includes a second processor for assigning a visual property to each image point in the two dimensional set of image points based upon the corresponding metric value. The computing device is configured to present the assigned visual properties of the two dimensional set of image points in a stack of other two dimensional sets of image points to provide a three dimensional appearance of the graphical element.

Implementations may include any or all of the following features. The first processor may be central processing unit or other type of processor. The second processor may be a graphical processing unit or other type of processor.

These and other aspects and features and various combinations of them may be expressed as methods, apparatus, systems, means for performing functions, program products, and in other ways.

Other features and advantages will be apparent from the description and the claims.

DESCRIPTION OF DRAWINGS

FIG. 2 illustrates an example of providing the appearance of three-dimensional text on a display of a computing device.

DETAILED DESCRIPTION

Figure 1:
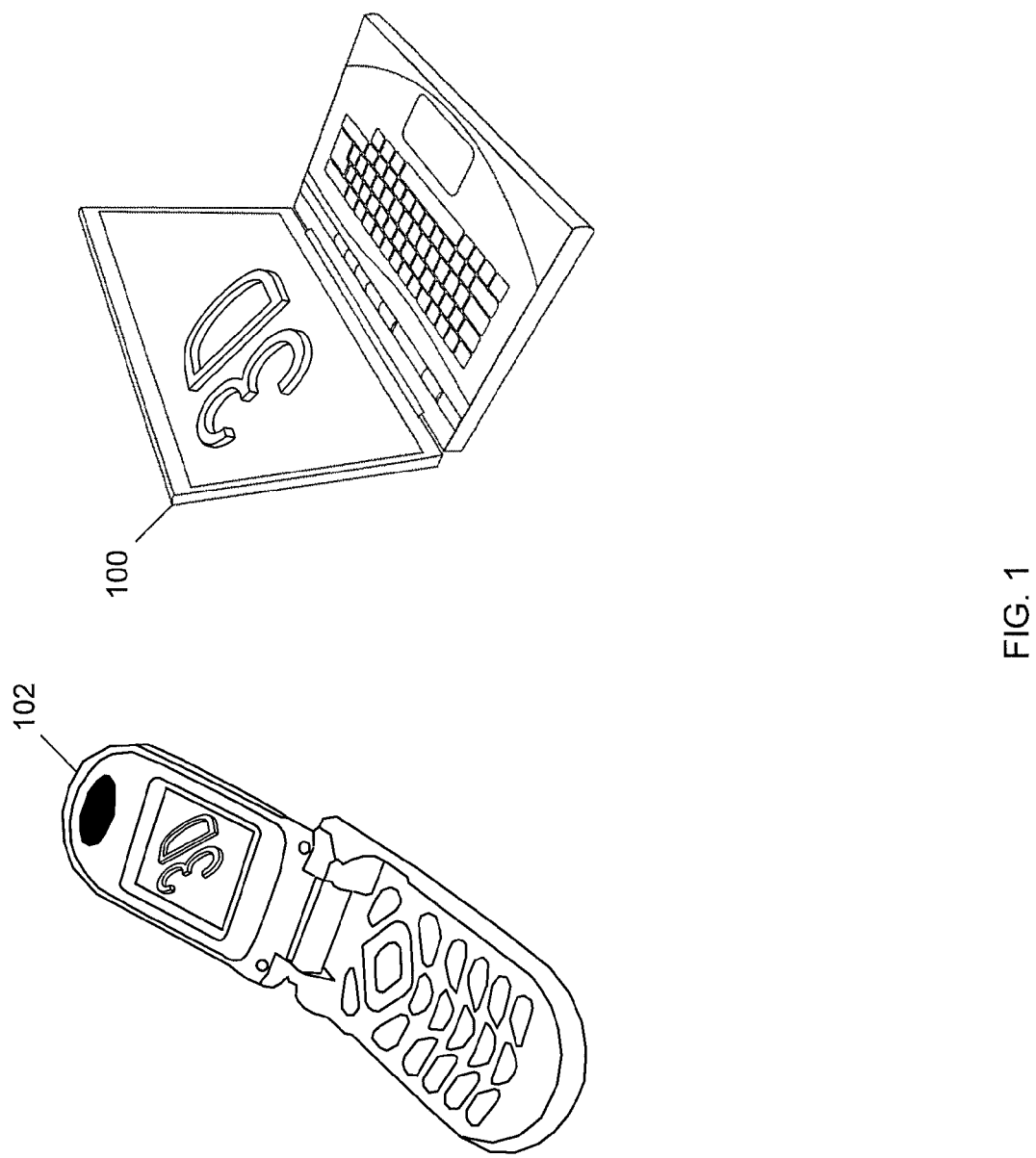
FIG. 1 illustrates various platforms capable of presenting a three-dimensional text.

Referring to FIG. 1, various type of computing devices and platforms may be used for computing and presenting different types of graphical representations such as three-dimensional (3D) graphics. For example, to catch the eye of a casual observer a website, webpage, electronic document, etc. may include 3D text for various applications and content presentations (e.g., advertisements, games, visual alerts, etc.). Typically 3D text is constructed and displayed such that it appears to exist in three dimensions and possibly give the appearance of having a solid structure. In most situations, 3D text is produced from a two-dimensional (2D) representation of the text characters (e.g., stored in a file), and a third dimension is produced by extruding a 2D image of text characters into the third dimension. Due to the need of computational resources, such extrusion processes are often executed offline and the extruded text is stored (e.g., as an image) for later retrieval and use.

Due to the continuing development of computing technology and the ever-expanding electronic device market, more and more devices are becoming part of everyday life and used for presenting various types of content (including text) to users. As such, many individuals have grown accustomed to having online, near real-time presentations of such content. For example, various type of computing devices (e.g., a laptop computer 100, a cellular telephone 102, etc.) may constantly be within arm's reach and expected to quickly provide such presentations. However, attempting to produce such extruded 3D text and rendering the text in near real-time can become computationally difficult. For example, to produce such a presentation, the 2D text may need to be reduced into a set of vertices that accurately represent the 2D shapes of the text. Next, vertices are typically defined and used to create the 3D structure of the text. Execution of such operations may not be computationally efficient. Further, such operations may not be well suited to be executed by specialized circuitry (e.g., a graphical processing unit (GPU)) designed to rapidly perform memory based operations (e.g., manipulate and alter memory locations) to accelerate the production of images intended for output to a display. However, processes may be developed and executed by such GPU's (and other types of specialized circuits) incorporated into computing devices (e.g., the laptop 100, the cellular telephone 102) such that their functionality may be exploited for presenting the appearance of 3D text in near real-time. For example, text and other types of graphical elements may appear to be presented in 3D by using GPU technology to produce and stack 2D representations of the text. By performing computations on 2D data and avoiding costly extrusion calculations that may be computed on a central processing unit (CPU) and/or a GPU, 3D text may be efficiently produced by devices that incorporate GPU technology.

Referring to FIG. 2, an efficiently computed graphical presentation is illustrated that uses representations of 2D text to provide the appearance of 3D text. As shown in image 200, a portion of an advertisement is presented that includes 3D text to draw the attention of a reader, e.g., that an advertised product has received a positive rating. At the typical viewing angle and resolution provided by the image 200, the 3D text appears to be constructed solid three dimensional structures (similar to an extruded version of the text). However, upon closer inspection (as provided a zoomed-in image 202), the 3D text is actually produced from four layers of 2D text 204, 206, 208, 210. In particular, along with increasing magnification, the image 202 also increases the viewing angle (from the normal viewing perspective) to present the four individual 2D text layers. As such, while the stacking of the 2D text layers provides the appearance of 3D text at many angles and magnifications, the individual layers can be detected. One or more techniques and methodologies may be implemented to combat the detectability of the individual 2D layers. For example, additional layers may be included in the stack of 2D text, one or more separation distances between the layers may be decreased (or increased, dependent upon the application and desired look). Different colors, positioning of light source(s), and other factors and parameters may also be adjusted.

Figure 3:
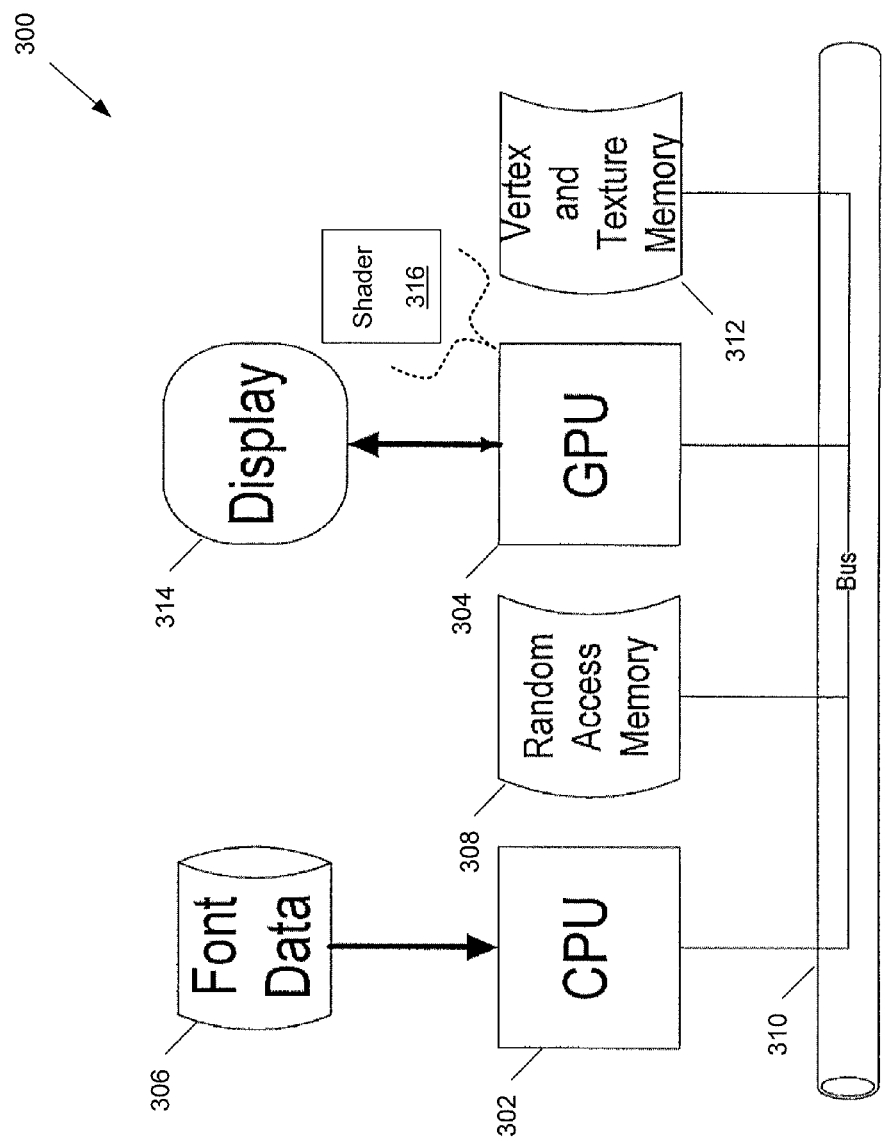
FIG. 3 illustrates a block diagram of a portion of a computing device for producing representations that provide the appearance of three-dimensional text.

Referring to FIG. 3, various types of implementations may be used for producing and displaying 2D representations of graphical elements to give the appearance of 3D structures. For example, hardware, software and combinations of hardware and software may be used for presenting such 3D appearances. For one example illustrated in the figure, an implementation may be based upon an architecture that includes a GPU and a CPU. Such an implementation may be incorporated in one or more types of platforms and computing devices (e.g., computer systems, cellular telephones, smart phones, tablet computing devices, etc.). In this example, a system 300 includes a CPU 302 and GPU 304 for producing multi-layered stacked presentations of 2D representations of graphic elements such as text. In general, one layer of 2D text may be produced and used in multiple instances to provide the other layers included in the stack. To produce this one layer, in this arrangement, the CPU 302 preforms operations to define individual image points of a set of image points that represent the 2D representation. In general, each image point may be considered as representing a single addressable point of a displayed image. For example, an image point can be considered a pixel or vertex fragment which may be a portion of a vertex (e.g., a triangular shaped element with fragment vertices) or a complete vertex (e.g., based upon magnification). Once represented on the 2D set of image points (e.g., a 2D grid of image points), the CPU 302 may calculate a metric value for each image point (e.g., pixel) for determining if the position of the image point is within the represented graphical element or outside the element. Once a metric value is calculated for each image point, the GPU 304 can efficiently determine from the value one or more visual properties to be assigned to the corresponding image point (e.g., pixel). For example, a predefined color may be assigned to each pixel determined to be located within the geometry of the graphical element, or, assigned to be transparent (e.g., assigned an alpha value) if determined to be located outside of the graphical element. Once appropriate colors or transparency is assigned to the pixels of each layer, the stack of layer may be constructed to present the appearance of a 3D version of the graphical element.

In this particular arrangement, the CPU 302 receives data that represents one or more fonts from a data store 306 (e.g., memory, storage device, etc.). Typically, font data is provided in the form of outlines that represent the 2D shape of glyphs that represent textual characters. From the received data, the CPU 302 produces a 2D image of a glyph (or other type of graphical element). Various types of 2D images may be produced by the CPU 302, for example, the image may be monochrome (bitmap), anti-aliased (grayscale) or another type of image. Once produced, the 2D image of the glyph may be temporarily stored (e.g., in a random access memory 308) as provided by the CPU 302 by way of a connection bus 310. Next, the glyph image may be provided to a memory 312 (labeled Vertex and Texture Memory) in the form of a 2D texture image. One or more forms may be used to define such 2D texture images, for example, one image may be provided for each glyph, character, text block, etc.

Once stored in 2D texture image form, the CPU 302 may retrieve the data for representing (e.g., mapping) the graphical element (e.g., glyph, character, text block) onto a set of image points (e.g., pixels). One or more techniques may be implemented for representing a graphical element onto image points. For example, a metric may be defined that identifies each image point located within the boundaries of the graphical element and each image located outside the boundaries. Once a value of the metric is known for each image point, a visual property may be assigned to the image point. For example, image points located on the interior of the graphical element (e.g., glyph) may be assigned an opaque color while image points located outside of the element may be assigned to be transparent (e.g., so as not to obscure pixels later stacked beneath).

Figure 4:
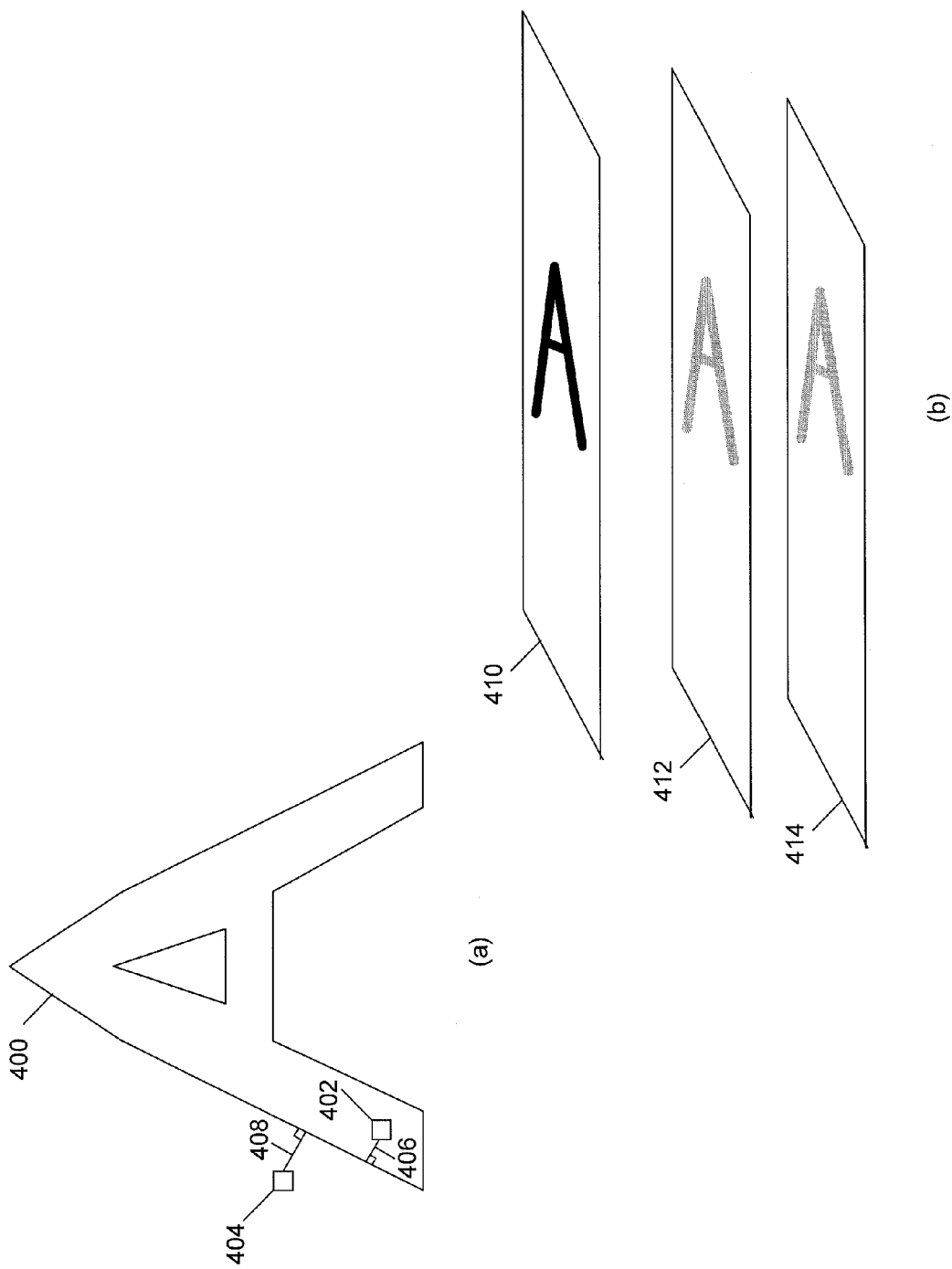
FIGS. 4(a), 4(b) and 5 illustrate techniques for defining visual properties of two-dimensional representations of a graphical element to produce the appearance of a three-dimensional representation of the graphical element.

Briefly referring to FIG. 4a, one metric is illustrated for defining the location of each image points in a set of image points relative to the geometry of a graphical element. In this example, a character 400 (e.g., the character "A") is mapped onto a set of image points (e.g., 2D grid of pixels). For this metric, referred to as a distance field, the distance between each image points and the outline of the character 400 is determined. For example, for respective image points 402, 404 (represented significantly magnified for viewing assistance), distances are determined from the image point to a normal location on the outline of the character 400, and correspondingly represented with lines 406, 408. To distinguish the distances as being within or external to the character outline, various conventions may be implemented. For example, distances associated with image points within the outline may be assigned positive values while distances associated with image points external to the outline may be assigned negative values. Once determined, these metric values may be used to assign the visual properties to the image points (e.g., pixels).

Returning to FIG. 3, in this arrangement, upon being calculated by the CPU 302, the metric values for each of the image points are stored in the vertex and texture memory 312. To apply the visual properties to the image points and produce the 2D representation layers, the data stored in the memory 312 is provided to the GPU 304. For example, the GPU 304 may replicate the received set of image points and associated information to produce multiple 2D representations of the graphical element. Briefly referring to FIG. 4b, two sets of image points 410, 412 are illustrated as being replicated by the GPU 304 from another set of image points 414 (e.g., retrieved from the memory 312). Additionally, each of the replicated sets of image points 410, 412 presents a 2D representation of the graphical element represented by the initial set of image points 414. Returning to FIG. 3, once the layers are produced, the GPU 304 may further execute operations in preparation of presenting the 2D representations. For example, the GPU 304 may determine properties associated with forming a stack. Along with determining the number of layers to be included in the stack, the GPU may also determine the separation between the stack layers, which may or may not be equivalent. Positioning and orientation of the stack for presentation on a display 314 (e.g., placing the stack on an electronic document, website, web page, etc.) may be determined by the GPU 304, the CPU 302 or by both devices operating in concert. For example, the layers of image points are typically stacked along a dimension that is orthogonal to the 2D representations (e.g., a dimensional defined by a z-axis). However, one or more of the layers may also be oriented differently for presenting different types of stacks (e.g., a slightly twisted stack, a stack of spiraling layers, etc.).

Prior to presentation, the GPU 304 also uses the image points and the associated information (e.g., metric values) retrieved from the memory 312 to assign appropriate colors to the image points (e.g., pixels) for displaying the 2D representation of the graphical element. One or more techniques and methodologies may be implemented by the GPU 304 for providing such color assignments. For example, the GPU 304 may review the metric value associated with each image point and assign a color based upon the value. In one arrangement, for image points with metric values indicating that the image points are located within the outline of the graphical element (e.g., a positive value), the GPU 304 may assign a particular color (e.g., an opaque color) such that the graphical element (e.g., the character "A") stands out from the background. Alternatively, for image points with metrics indicating that the image points are located outside the outline of the graphical element (e.g., a negative value), the GPU 304 may assign that the image points be treated as transparent (e.g., assigned an alpha value such that any underlying objects are allowed to control the color of these image points).

Figure 5:
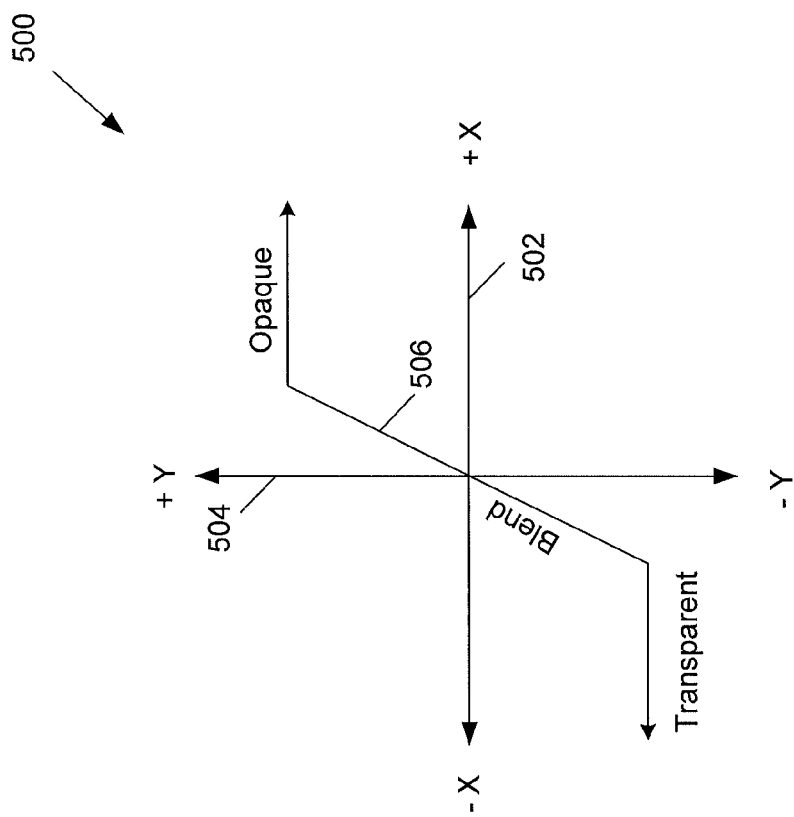

In still another example, the GPU 304 may assign visual properties to define a transition region (e.g., for image points located near to the outline of the graphical element). Referring briefly to FIG. 5, a coordinate system 500 is presented that defines visual property assignments (e.g., color assignments) based upon three regions within which an image property may be located. In particular, an x-axis 502 represents the metric values of the image points (e.g., positive values represent image points within the outline of the graphical element, negative values represent image points outside the outline of the graphical element, etc.). A y-axis 504 represents the visual property to be assigned to each image point based upon the metric value (e.g., distance from the outline). For example, for image points located well within the outline (e.g., large positive metric values along with x-axis 502), an opaque color is assigned. Similarly, for image points well outside the outline (e.g., large negative metric values along the x-axis 502), a transparent visual property is assigned. For image points located generally close to the outline of the graphical element (e.g., near zero metric values along the x-axis 502), a blended color (between opaque and being transparent) may be assigned as defined by a line 506 (that represents the transition between opaque and transparent). Along with using other techniques for assigning visual properties, other types of visual properties may be assigned. For example, rather than assigning colors, different patterns or other graphical features may be assigned.

Returning to FIG. 3, one or more processing techniques may be implemented by the GPU 304 to prepare the 2D representations for presentation in the stack. For example, along with assigning visual properties (e.g., an opaque color, being transparent, etc.) to the image points (e.g., pixels) of each 2D representation, different color schemes may be implemented based upon the located of the 2D representation within the stack. For example, the graphical element of the upper-most 2D representation (e.g., assigned the top position of the stack and closest to the viewer) may be assigned a relatively dominate color that stands out in the foreground. For 2D representations located beneath (e.g., assigned a positions within the stack or at the base of the stack), one or more colors may be assigned that are less dominate and simply provide a color to highlight the foreground color (of the upper-most layer). For example, as illustrated in FIG. 4b, while the graphical element (e.g., the character "A") is present in a dark, black color in the upper most 2D representation 410 (located at the top of the stack), a lighter gray color is used for the graphical element in the two lower 2D representations 412, 414.

As illustrated in FIG. 3, to provide the functionality of preparing 2D representations for presentation on the display 314, the GPU 304 includes a shader 316. In some arrangements, the shader 316 can be considered as a set of software instructions that may be executed by the GPU 304 to calculate rendering effects with a relatively high degree of flexibility. For example, the shader 316 may be used to program the GPU 304 to perform operations for efficiently manipulating properties (e.g., position, color, etc.) of image points (e.g., pixels). As such, the shader 316 may be able to efficiently determine and assign visual properties to image points based upon the metric values (e.g., distance field values) calculated, for example, by the CPU 302. In some arrangements, to further increase efficiency, multiple shaders may be introduced. For example the GPU 304 may include a separate shader for processing each 2D representation layer to be stacked. As such, upon a set of image points and corresponding information (e.g., metric values) being provided to the GPU 304 (e.g., from the memory 312), a 2D representation for each corresponding stack layer may be processed by a dedicated shader. Along with reducing the time needed for rendering (e.g., by a CPU), memory needs may also be reduced. Further, by operating upon image points and a layered stack, computational resources may be conserved compared to performing calculations associated with extruding (e.g., defining 3D structural elements, calculating connections among structural elements to form 3D structures, etc.). By reducing the computational needs and improving efficiency, such layered stacks may be computed in near real time at relatively high frame rates by one or more GPUs.

Providing the appearance of 3D graphical elements by implementing such layered stacks of 2D representations may be used in various environments. For example, along with forming layered stacks of representations on flat surfaces, e.g., an electronic document, webpage, etc., such stacks may be placed on other type of surface representations. For example, by segmenting the stacks and/or producing multiple stacks, stacks may be positioned on portions of curved surfaces to provide the appearance of one or more graphical elements (e.g., a banner of text) being draped over a non-flat surface. The stacks and/or the layers of the stacks may also be adjusted for various applications. For example, stack height, the number of layers, separation between the layers, etc. may be adjusted for to provide an appropriate appearance of 3D imagery. In other examples, multiple stacks may be used together to provide different visual effects. For example, slightly differently produced stacks may be used for producing stereoscopic images (e.g., a left eye view and a right eye view) such that different views are provided at different perspectives (e.g., to produce a 3D display).

Figure 6:
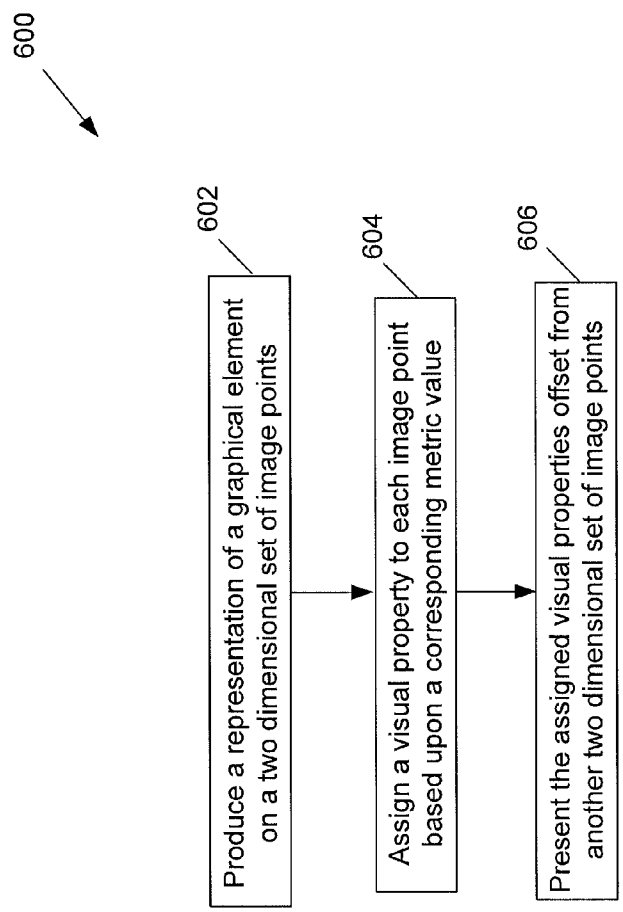
FIG. 6 is an example flow chart of operations for producing two-dimensional representations to produce the appearance of a three-dimensional representation.

Referring to FIG. 6, a flowchart 600 represents operations of a computing device such as a computer system for producing a stack of two dimensional representations to provide the appearance of a three dimensional graphical element (e.g., glyph, character, text, etc.). Such operations are typically executed by a single computing device, however, the execution of the operations may be executed by multiple computing devices. Along with being executed at a single site (e.g., at the location of a computing device), operation execution may be distributed among two or more locations.

Operations of the computing device may include producing 602 a representation of a graphical element on a two dimensional set of image points. For example, a representation of a particular glyph or character (e.g., the character "A") may be produced such that a rendering appears as a three dimensional structure (e.g., in an electronic document). Operations may also include assigning 604 a visual property to each image point in the two dimensional set of image points based upon a corresponding metric value. For example, a metric value (e.g., a distance field value) may be calculated for each image point based upon the location of the respective image point. From the calculated metric value, a color or alpha value may be assigned to the image point. Operations may also include presenting 606 the assigned visual properties of the two dimensional set of image points as being offset from another two dimensional set of image points. For example, the visual properties may be used to define a layer in a multi-layer stack in which the defined layer represents a 2D representation of the graphical element.

Figure 7:
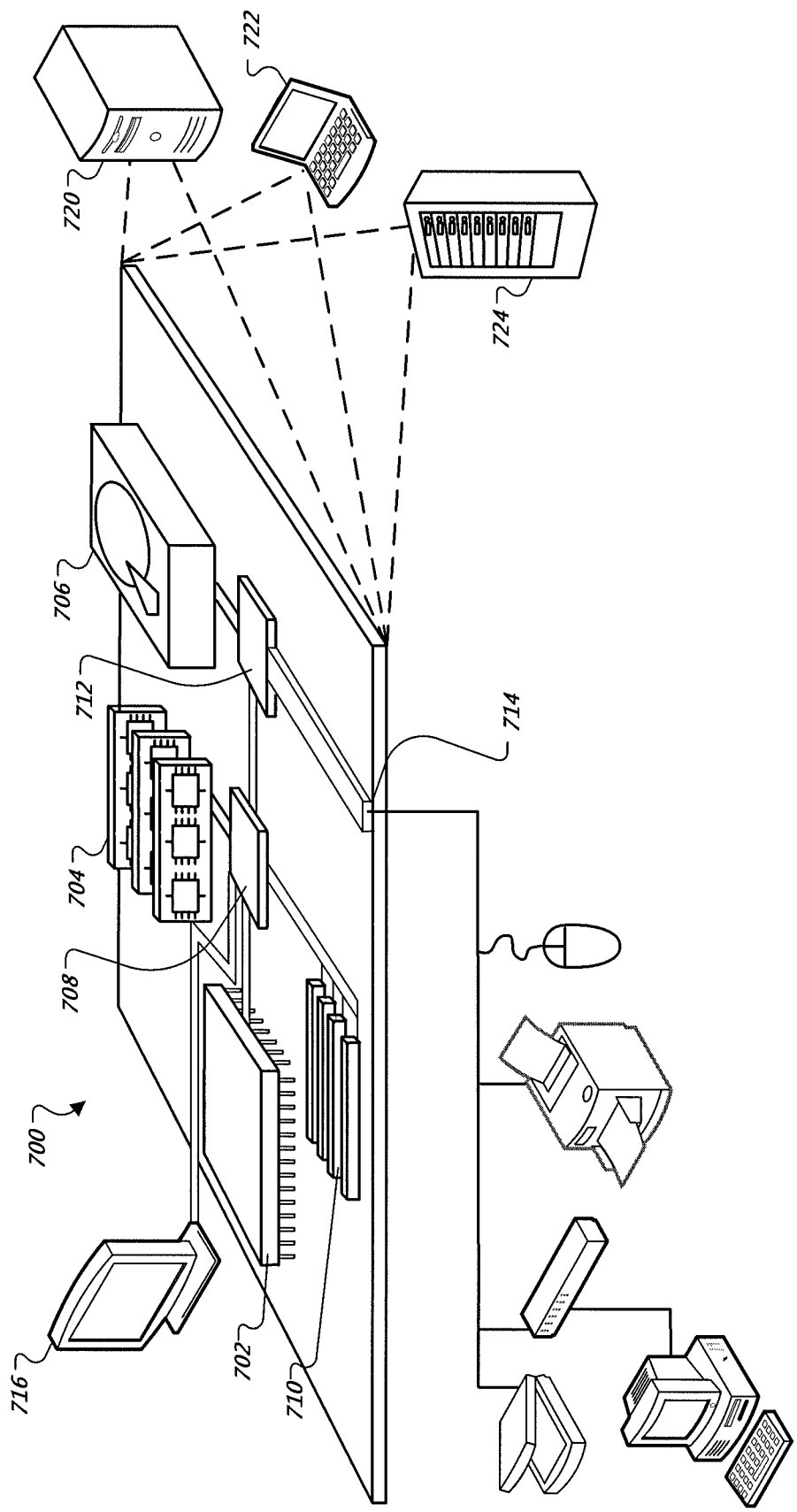
FIG. 7 is a block diagram of computing devices and systems.

FIG. 7 is a block diagram of computing devices that may be used and implemented to perform operations associated with producing a stack of 2D representations of a graphical element to provide the appearance of a 3D structure of the element. Computing device 700 is intended to represent various forms of digital computers, image processing devices and similar type device, such as digital TV sets, set-top boxes and receivers (e.g., cable, terrestrial, Internet Protocol television (IPTV), etc.), laptops, desktops, workstations, personal digital assistants, mobile devices such as cellular telephones, tablet computing devices, portable gaming devices, portable navigational devices, servers, blade servers, mainframes, and other appropriate computers.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses can be used, as appropriate, along with multiple memories and types of memory. Also, multiple computing devices 700 can be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or the like.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 707, display 716 (e.g., through a graphics processor or accelerator), and to high-speed expansion ports 710, which can accept various expansion cards (not shown). In the implementation, low-speed controller 712 is coupled to storage device 706 and low-speed expansion port 714. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit), specialized processing units (e.g., GPUs), etc.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    producing a representation of a graphical element on a two dimensional set of vertices,
    wherein a metric value is calculated for each vertex in the two dimensional set of vertices;
    assigning a visual property to each vertex in the two dimensional set of vertices based upon the corresponding metric value; and
    presenting the assigned visual properties of the two dimensional set of vertices as being offset from another two dimensional set of vertices to provide a three dimensional appearance of the graphical element,
    the offset separates the two dimensional set of vertices and the other two dimensional set of vertices along an axis orthogonal to the two dimensional set of vertices and the other two dimensional set of vertices.

2. The computer-implemented method of claim 1, in which producing the representation of the graphical element on the two dimensional set of vertices is provided by a central processing unit.

3. The computer-implemented method of claim 1, in which assigning the visual property to each vertex is provided by a graphical processing unit.

4. The computer-implemented method of claim 1, in which the visual property is an opaque visual property.

5. The computer-implemented method of claim 1, in which the visual property includes a transparent visual property.

6. The computer-implemented method of claim 1, in which each vertex in the two dimensional set of vertices represents a pixel.

7. The computer-implemented method of claim 1, in which the metric value is based upon a distance between the position of the vertex and a boundary of the representation of the graphical element.

8. The computer-implemented method of claim 1, in which the graphical element is a textual element.

9. The computer-implemented method of claim 1, in which assigning the visual property to each vertex is provided by a shader process executed by a graphical processing unit.

10. A system comprising:
    a computing device for producing a representation of a graphical element on a two dimensional set of vertices,
    wherein a metric value is calculated for each vertex in the two dimensional set of vertices,
    the computer device is configured to assign a visual property to each vertex in the two dimensional set of vertices based upon the corresponding metric value,
    the computing device is also configured to present the assigned visual properties of the two dimensional set of vertices as being offset from another two dimensional set of vertices to provide a three dimensional appearance of the graphical element,
    the offset separates the two dimensional set of vertices and the other two dimensional set of vertices along an axis orthogonal to the two dimensional set of vertices and the other two dimensional set of vertices.

11. The system of claim 10, in which the computing device includes a central processing unit for producing the representation of the graphical element on the two dimensional set of vertices.

12. The system of claim 10, in the computing device includes a graphical processing unit for assigning the visual property to each vertex.

13. The system of claim 10, in which the visual property is an opaque visual property.

14. The system of claim 10, in which the visual property includes a transparent visual property.

15. The system of claim 10, in which each vertex in the two dimensional set of vertices represents a pixel.

16. The system of claim 10, in which the metric value is based upon a distance between the position of the vertex and a boundary of the representation of the graphical element.

17. The system of claim 10, in which the graphical element is a textual element.

18. The system of claim 10, in which the computing device includes a graphical processing unit for executing a shader process to assign the visual property to each vertex.

19. One or more non-transitory computer readable media storing instructions that are executable by one or more processing devices, and upon such execution cause the one or more processing devices to perform operations comprising:
    producing a representation of a graphical element on a two dimensional set of vertices,
    wherein a metric value is calculated for each vertex in the two dimensional set of vertices;
    assigning a visual property to each vertex in the two dimensional set of vertices based upon the corresponding metric value; and
    presenting the assigned visual properties of the two dimensional set of vertices as being offset from another two dimensional set of vertices to provide a three dimensional appearance of the graphical element,
the offset separates the two dimensional set of vertices and the other two dimensional set of vertices along an axis orthogonal to the two dimensional set of vertices and the other two dimensional set of vertices.

20. The non-transitory computer readable media of claim 19, in which producing the representation of the graphical element on the two dimensional set of vertices is provided by a central processing unit.

21. The non-transitory computer readable media of claim 19, in which assigning the visual property to each vertex is provided by a graphical processing unit.

22. The non-transitory computer readable media of claim 19, in which the visual property is an opaque visual property.

23. The non-transitory computer readable media of claim 19, in which the visual property includes a transparent visual property.

24. The non-transitory computer readable media of claim 19, in which each vertex in the two dimensional set of image points represents a pixel.

25. The non-transitory computer readable media of claim 19, in which the metric value is based upon a distance between the position of the vertex and a boundary of the representation of the graphical element.

26. The non-transitory computer readable media of claim 19, in which the graphical element is a textual element.

27. The non-transitory computer readable media of claim 19, in which assigning the visual property to each vertex is provided by a shader process executed by a graphical processing unit.

28. A computing device comprising:
a memory for storing instructions;
a first processor for executing the instructions to produce a representation of a graphical element on a two dimensional set of vertices,
wherein a metric value is calculated for each vertex in the two dimensional set of vertices;
a second processor for assigning a visual property to each vertex in the two dimensional set of vertices based upon the corresponding metric value; and
wherein the computing device is configured to present the assigned visual properties of the two dimensional set of vertices in a stack of other two dimensional sets of vertices to provide a three dimensional appearance of the graphical element,
the stack separates the two dimensional set of vertices and the other two dimensional sets of vertices along an axis orthogonal to the two dimensional set of vertices and the other two dimensional sets of vertices.

29. The system of claim 28, in which the first processor is central processing unit.

30. The system of claim 28, in which the second processor is a graphical processing unit.

31. A computer-implemented method comprising:
producing a representation of a graphical element on a two dimensional set of image points, wherein a metric value is calculated for each image point in the two dimensional set of image points, the metric value is based upon a distance between the position of the image point and a boundary of the representation of the graphical element;
assigning a visual property to each image point in the two dimensional set of image points based upon the corresponding metric value; and
presenting the assigned visual properties of the two dimensional set of image points as being offset from another two dimensional set of image points to provide a three dimensional appearance of the graphical element, the offset separates the two dimensional set of image points and the other two dimensional set of image points along an axis orthogonal to the two dimensional set of image points and the other two dimensional set of image points.

32. A system comprising:
a computing device for producing a representation of a graphical element on a two dimensional set of image points, wherein a metric value is calculated for each image point in the two dimensional set of image points, the metric value is based upon a distance between the position of the image point and a boundary of the representation of the graphical element, the computer device is configured to assign a visual property to each image point in the two dimensional set of image points based upon the corresponding metric value, the computing device is also configured to present the assigned visual properties of the two dimensional set of image points as being offset from another two dimensional set of image points to provide a three dimensional appearance of the graphical element, the offset separates the two dimensional set of image points and the other two dimensional set of image points along an axis orthogonal to the two dimensional set of image points and the other two dimensional set of image points.

33. One or more non-transitory computer readable media storing instructions that are executable by one or more processing devices, and upon such execution cause the one or more processing devices to perform operations comprising:
producing a representation of a graphical element on a two dimensional set of image points, wherein a metric value is calculated for each image point in the two dimensional set of image points, the metric value is based upon a distance between the position of the image point and a boundary of the representation of the graphical element;
assigning a visual property to each image point in the two dimensional set of image points based upon the corresponding metric value; and
presenting the assigned visual properties of the two dimensional set of image points as being offset from another two dimensional set of image points to provide a three dimensional appearance of the graphical element, the offset separates the two dimensional set of image points and the other two dimensional set of image points along an axis orthogonal to the two dimensional set of image points and the other two dimensional set of image points.

34. A computing device comprising:
a memory for storing instructions;
a first processor for executing the instructions to produce a representation of a graphical element on a two dimensional set of image points, wherein a metric value is calculated for each image point in the two dimensional set of image points, the metric value is based upon a distance between the position of the image point and a boundary of the representation of the graphical element;
a second processor for assigning a visual property to each image point in the two dimensional set of image points based upon the corresponding metric value; and
wherein the computing device is configured to present the assigned visual properties of the two dimensional set of image points in a stack of other two dimensional sets of image points to provide a three dimensional appearance of the graphical element, the offset separates the two dimensional set of image points and the other two dimensional set of image points along an axis orthogonal to the two dimensional set of image points and the other two dimensional set of image points.

* * * * *

UNITED STATES PATENT AND TRADEMARK OFFICE
CERTIFICATE OF CORRECTION

| | |
|---|---|
| PATENT NO. | : 8,896,593 B2 |
| APPLICATION NO. | : 13/153956 |
| DATED | : November 25, 2014 |
| INVENTOR(S) | : Robert Joseph Taylor |

It is certified that error appears in the above-identified patent and that said Letters Patent is hereby corrected as shown below:

In the Claims

Column 13, Line 20-21, In Claim 24, delete "image points" and insert -- vertices --

Column 13, Line 51, In Claim 29, delete "system" and insert -- computing device --

Column 13, Line 53, In Claim 30, delete "system" and insert -- computing device --

Signed and Sealed this
Fourteenth Day of April, 2015

Michelle K. Lee
*Director of the United States Patent and Trademark Office*